United States Patent Office 3,532,733
Patented Oct. 6, 1970

3,532,733
ORGANOSILICON SULFIDES
Kenneth M. Lee, Bay City, Mich., assignor to Dow Corning Corporation, Midland, Mich., a corporation of Michigan
No Drawing. Filed Mar. 11, 1968, Ser. No. 711,843
Int. Cl. C07f 7/18
U.S. Cl. 260—448.8      4 Claims

ABSTRACT OF THE DISCLOSURE

A process for producing useful organosilicon sulfides involving a substitution reaction in which the reactant contains a halogen atom, i.e., chlorine, bromine, or iodine, the halogen atom being attached beta to the silicon atom. The reaction is preferably conducted in the presence of an inert organic solvent and at a temperature within the range from 0° C. to 150° C. In contrast to expected cleavage of the Si—C bond, substitution occurs. Illustrative of the novel process is the following:

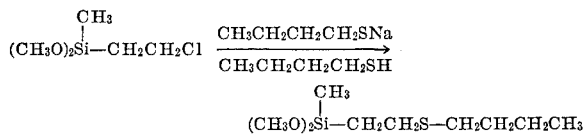

The organosilicon sulfides are useful as coupling agents and intermediates to prepare compounds useful as water repellants and oxidation inhibitors.

---

This invention relates to a process for producing useful organosilicon sulfides via a substitution reaction. More particularly, the present invention relates to a process for producing useful organosilicon sulfides in which the starting reactant possesses a halogen atom beta to the silicon atom.

It is well known that halogen atoms, for example, the chlorine atom, which are located beta to the silicon atom are notoriously unstable. For this reason, substitution reactions conducted in the presence of certain solvents, i.e., alcoholic alkali such as methanol and the like, are virtually impossible due to the fact that cleavage of the Si—C bond rapidly occurs. As a means of illustration, it is common knowledge that a compound such as beta-chloroethyltriethylsilane is far less stable to alkali than the alphaisomer; aqueous or alcoholic alkali readily initiates a rapid and quantitative formation of ethylene and liberation of chloride ion, and even sodium acetate in glacial acetic acid, or water alone decomposes the related compounds CH₃CH₂Cl₂SiCH₂CH₂Cl and $$CH_3CH_2SiF_2CH_2CH_2Cl$$

It is an object of the present invention to provide a process for producing useful organosilicon sulfides via a substitution reaction which proceeds in normal fashion employing as the reactant, a silicon compound which contains a halogen atom located beta to the silicon atom. The process can be achieved in the presence or absence of inert organic solvents and, in view of the state of the art, it is both surprising and unusual that substitution (as opposed to expected cleavage) would occur.

It is also an object of this invention to provide a process for producing organosilicon sulfides which are useful as coupling agents, as intermediates for compounds which can be employed as water repellants, oxidation inhibitors and the like.

It is a further object of the present invention to provide a process for producing organosilicon sulfides having the aforementioned uses by methods which are far more economical and feasible than methods known heretofore. These and other objects will become more apparent from the detailed description which follows.

This invention relates to a process for preparing organosilicon sulfides which comprises, (1) contacting
   (A) a compound of the formula

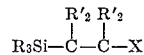

in which
        R is selected from the group consisting of a monovalent hydrocarbon radical free of aliphatic unsaturation, an alkoxy radical, an acyloxy radical, an aryloxy radical, and a hydrocarbon thio radical,
        R' is selected from the group consisting of monovalent hydrocarbon radical free of aliphatic unsaturation and a hydrogen atom, and
        X is a halogen atom selected from the group consisting of a chlorine atom, a bromine atom, and an iodine atom, with
   (B) a compound of the formula R″SM, in which
        R″ is selected from the group consisting of a monovalent hydrocarbon radical free of aliphatic unsaturation, a hydrogen atom, a N≡C— radical, and radicals of the formula

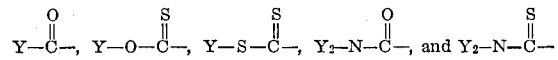

in which
           Y is a monovalent hydrocarbon radical free of aliphatic unsaturation of from 1 to 6 carbon atoms inclusive,
           M is an alkali or alkaline earth metal, thereafter, (2) recovering
   (C) an organosilicon sulfide of the formula

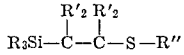

in which R, R' and R″ are as above defined.

In the formulae noted above, R, R' and R″ can be a monovalent hydrocarbon radical free of aliphatic unsaturation such as the methyl, ethyl, propyl, isopropyl, butyl, t-butyl, amyl, hexyl, nonyl, pentyl, phenyl, tolyl, cyclopentyl, cyclohexyl, dodecyl, octadecyl, and the myricyl radical among numerous others.

R can also be an alkoxy radical such as the methoxy, ethoxy, propoxy, isopropoxy, and the butoxy radical; it can also be an acyloxy radical such as the acetoxy, the

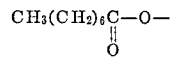

the

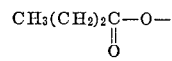

and the

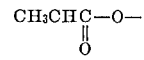

radical among others; it can also be an aryloxy radical, i.e., the phenoxy, xyloxy, 2-phenylethyloxy and the naphthyloxy radical; and it can be a hydrocarbon thio radical such as the

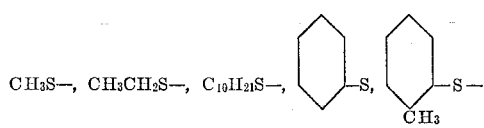

and the

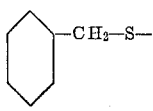

radical among many others.

X can be a halogen atom selected from the group consisting of a chlorine atom, a bromine atom, and an iodine atom.

Y can be a monovalent hydrocarbon radical free of aliphatic unsaturation from 1 to 6 carbon atoms inclusive such as the methyl, ethyl, propyl, isopropyl, butyl, isobutyl, t-butyl, amyl, hexyl, and the phenyl radical among others.

M is an alkali or alkaline earth metal such as sodium, lithium, potassium, cesium, magnesium, calcium and strontium.

The process of this invention proceeds exothermically and hence, temperature is not a particularly critical factor. It is preferred, however, that the temperature be maintained above room-temperature to facilitate the rate of the reaction. It is also preferred that the temperature be maintained below 150° C. Temperatures in excess of 150° C. may initiate deleterious side reactions which will result in decreased yields of the desired organosilicon sulfide.

The reaction can be conducted in the absence or presence of an inert organic solvent, i.e., tetrahydrofuran, hexane, excess mercaptan, toluene, xylene, ethers, and the like. It is preferred that a solvent be employed, however, to insure that the alkali or alkaline earth metal thiolate be at least partially solubilized.

Although it is not necessary, it is also preferred that the reaction be carried out in a substantially inert atmosphere, i.e., $N_2$ or in a sealed system to prevent the inclusion of oxygen which may interfere with the reaction and lead to undesirable side reactions.

It has been found that the best method for preparing the organosilicon sulfides of the present invention involves the addition of the alkali metal to an excess of mercaptan or to an inert organic solvent, i.e., tetrahydrofuran containing mercaptan. As noted heretofore, the solvent is to be preferred so that compound (B) [R"SM] will be at least partially solubilized. An excess of the mercaptan or an inert organic solvent containing mercaptan is particularly preferred since, in the absence of an excess of mercaptan or an inert organic solvent containing the mercaptan, a thick slurry of the material results and this tends to interfere with the reaction as well as being difficult to handle. Following the above, the reactant containing the halogen atom beta to the silicon atom is slowly added, preferably in small amounts. The salt is then filtered and the desired organosilicon sulfide is distilled and recovered.

The following examples are illustrative only and are not intended to limit the scope of the invention which is properly delineated in the appended claims.

EXAMPLE 1

5.0 g. of sodium metal was added to 100 g. (an excess) of butanethiol. 16.8 g. of 2-chloroethylmethyldimethoxysilane was then added slowly in small portions. After the reaction the salt was filtered and 14.3 g. (a 64.3 percent yield) of a compound of the formula

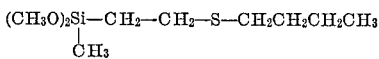

was obtained.

EXAMPLE 2

24.0 g. (an excess) of butanethiol and 1.15 g. of metallic sodium were reacted in an $N_2$ atmosphere. The resulting solution of $CH_3CH_2CH_2CH_2SNa$ and butyl mercaptan was warmed to 80° C. and 12.2 g. of 2-bromopropyltrimethoxysilane was slowly added in dropwise fashion over a period of one hour. The temperature (80° C.) was maintained for 20 hours. The salts were centrifuged, separated, and washed with hexane, 2.8 g. (22 percent yield) of a product of the formula

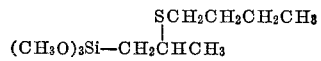

was obtained. The structure of the product was confirmed by mass spectral analyses, N.M.R. analyses, and infrared.

EXAMPLE 3

1.82 g. of propanethiol was weighed into a 9 mm. Pyrex tube which was cooled in ice. 15 mls. (1.6 molar) butyl lithium in hexane was then introduced into the tube. 4.04 g. of 2-chloroethylmethyldimethoxysilane and hexane (25 mls.) was then added. The tube was sealed and heated at a temperature of 100° C. for 16 hours. The salts were removed by filtration and 2.18 g. (43.7 percent yield) of a compound of the formula

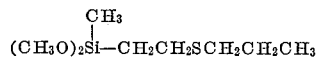

was obtained. The structure of the product was confirmed by mass spectral analyses, N.M.R. analyses and infrared.

EXAMPLE 4

When the following compounds were substituted for the corresponding compounds of Example 3, the organosilicon sulfides noted below were obtained:

(A)

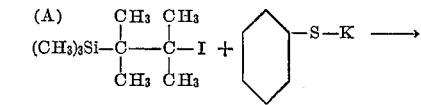

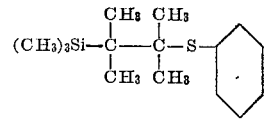

(B)

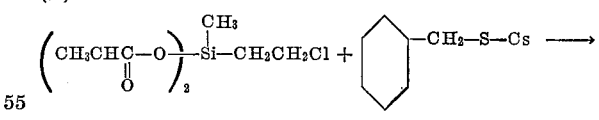

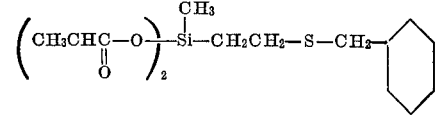

(C)

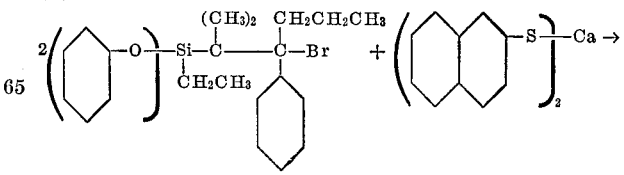

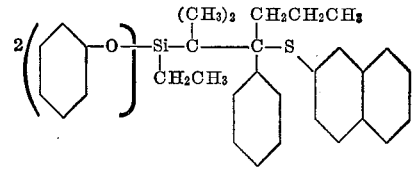

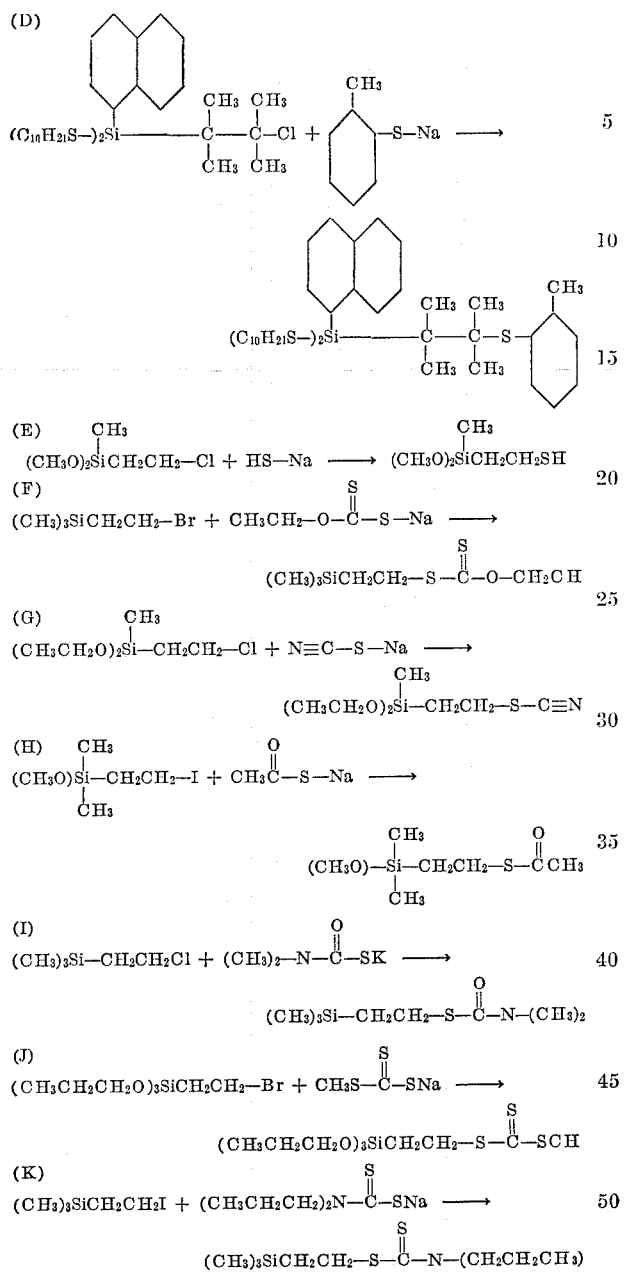

That which is claimed is:
1. A process for preparing organosilicon sulfides which comprises
   (1) contacting
      (A) a compound of the formula $$R_3Si-\underset{R'_2}{\underset{|}{C}}-\underset{R'_2}{\underset{|}{C}}-X$$

in which
      R is selected from the group consisting of a monovalent hydrocarbon radical free of aliphatic unsaturation, an alkoxy radical, an acyloxy radical, an aryloxy radical, and a hydrocarbon thio radical,
      R' is selected from the group consisting of a monovalent hydrocarbon radical free of aliphatic unsaturation and a hydrogen atom, and
      X is a halogen atom selected from the group consisting of a chlorine atom, a bromine atom, and an iodine atom, with (B) a compound of the formula R"SM, in which R" is selected from the group consisting of a monovalent hydrocarbon radical free of aliphatic unsaturation, a hydrogen atom, an N≡C— radical, and radicals of the formulae

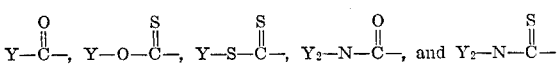

in which
      Y is a monovalent hydrocarbon radical free of aliphatic unsaturation of from 1 to 6 carbon atoms inclusive, and
      M is an alkali or alkaline earth metal, thereafter
   (2) recovering
      (C) an organosilicon sulfide of the formula $$R_3Si-\underset{R'_2}{\underset{|}{C}}-\underset{R'_2}{\underset{|}{C}}-S-R''$$

in which
      R is selected from the group consisting of a monovalent hydrocarbon radical free of aliphatic unsaturation, an alkoxy radical, an acyloxy radical, an aryloxy radical, and a hydrocarbon thio radical,
      R' is selected from the group consisting of a hydrocarbon radical free of aliphatic unsaturation and a hydrogen atom, and
      R" is selected from the group consisting of a monovalent hydrocarbon radical free of aliphatic unsaturation, a hydrogen atom, an N≡C—radical, and radicals of the formula

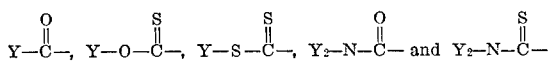

in which Y is a monovalent hydrocarbon radical free of aliphatic unsaturation of from 1 to 6 carbon atoms inclusive.

2. The process as recited in claim 1 in which compound (A) is of the formula

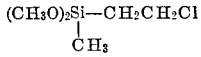

and compound (B) is of the formula $$CH_3CH_2CH_2CH_2SNa$$

3. The process as recited in claim 1 in which compound (A) is of the formula

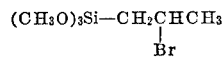

and compound (B) is of the formula $$CH_3CH_2CH_2CH_2SNa$$

4. The process as recited in claim 1 in which compound (A) is of the formula

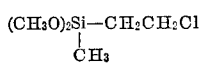

and compound (B) is of the formula $CH_3CH_2CH_2S$-Li.

References Cited

UNITED STATES PATENTS 2,960,492  11/1960  Morton et al. ____ 260—448.2 X
3,345,393  10/1967  Simmler et al.

TOBIAS E. LEVOW, Primary Examiner
P. F. SHAVER, Assistant Examiner

U.S. Cl. X.R.

106—13: 252—400; 260—448.2